United States Patent [19]
Maietti et al.

[11] Patent Number: 4,587,167
[45] Date of Patent: May 6, 1986

[54] PRINTABLE RELEASE-COATING COMPOSITIONS AND PRINTING INK FOR PRESSURE-SENSITIVE ADHESIVE TAPE

[75] Inventors: Adriano Maietti, Casale Monferrato; Carlo Borgatelli, Rive, both of Italy

[73] Assignee: Vibac S.p.A., Ticineto, Italy

[21] Appl. No.: 605,255

[22] Filed: Apr. 30, 1984

[30] Foreign Application Priority Data

May 3, 1983 [IT] Italy ................................ 67479 A/83

[51] Int. Cl.$^4$ ............................. C09J 7/02; C09J 7/04
[52] U.S. Cl. .................................... 428/352; 428/346; 428/354; 428/451; 428/476.3; 428/479.3; 428/524; 428/323; 106/20
[58] Field of Search ............... 428/323, 352, 354, 346, 428/451, 524, 476.3, 477.4; 106/20

[56] References Cited

U.S. PATENT DOCUMENTS 3,978,274  8/1976  Blum ................................. 428/476.3
4,064,312 12/1977  Crystal ............................ 428/451 X
4,070,523  1/1978  Blum et al. ......................... 428/352

*Primary Examiner*—Patricia C. Ives
*Attorney, Agent, or Firm*—Cushman, Darby & Cushman

[57] ABSTRACT

The release-coating composition for producing a pressure-sensitive, printable adhesive tape is constituted by a polymeric component comprising from 10 to 85 parts by weight of a ketone resin, from 0 to 80 parts by weight of a polyamide resin and from 0 to 30 parts by weight of a ketone resin modified by reaction with alkylisocyanates, and solvents for the polymeric component. For the production of a printed adhesive tape, there is used, in combination with said release-coating composition, an ink comprising, with reference to the weight of the ink form 25% to 35% by weight of a polyamide resin which is soluble in alcohols and from 0.3% to 1% by weight of a silicone polymer as a slip agent.

4 Claims, No Drawings

PRINTABLE RELEASE-COATING COMPOSITIONS AND PRINTING INK FOR PRESSURE-SENSITIVE ADHESIVE TAPE

The present invention relates to the production of pressure-sensitive, printable adhesive tapes of the type comprising a substrate in the form of a polymeric olefin film, a layer of pressure-sensitive adhesive on one face of the substrate and a release layer on the other face of the substrate intended to receive the printing ink.

It is known that pressure-sensitive adhesive tapes are usually wound in rolls with the side covered by the adhesive layer adhering to the back of the tape in the adjacent turn. In order to facilitate the unrolling of the tape and avoid breakage or detachment of the adhesive, it is necessary to deposit a coating with an anti-adhesive action, called a "release coating", on the non-adhesive face.

In order to make a printed adhesive tape, it is desirable for the printing to be applicable to the back of the tape covered by the layer of release agent.

In essence, the requirements for a release-coating composition for making printed adhesive tapes are:

(a) good adhesion to the polyolefin substrate film without this necessitating the application of an intermediate layer of primer.

(b) the adhesiveness of the back should be no more than 450 g/cm, measured in accordance with the PSTC Standards, even after prolonged ageing.

(c) good receptiveness to printing inks allowing printing with sharp outlines.

(d) retention of the release properties even in zones covered by the printing inks.

(e) absence of set-off, or ink transfer, even after ageing.

In order to satisfy these requirements, the prior art makes use of release-coating compositions including a number of polymeric compounds.

In particular, U.S. Pat. No. 3,978,274 describes a printable release-coating composition comprising a vinylic film-forming agent, an acrylic resin and a polyamide plasticising resin.

U.S. Pat. No. 4,070,523 describes a composition including a polymeric component with a release action, a film-forming agent, among which are mentioned polyamide resins in general, and a polyketone resin.

Both cases cited above need to use at least three polymeric components, and because of the different natures and incompatibility of the polymeric components, and in order to obtain a homogeneous solution for application of the release-coating, they also need to use a mixture of at least three solvents to dissolve the polymeric components. This latter factor, as well as complicating the measurement of the ingredients, makes it more difficult and complicated to separate the solvents recovered during the oven-drying of the release-coating composition deposited on the adhesive strip.

A first object of the present invention is to provide a release-coating composition which is able to satisfy the requirements (a)–(e) mentioned above.

Moreover, a second object is to provide a release-coating composition which is perfectly soluble in a mixture of two solvents.

Hence one subject of the present invention is a release-coating composition characterised in that it is constituted by:

from 5% to 20% by weight, with reference to the weight of the composition, of a polymeric component comprising, per 100 parts of the polymeric component, from 10 to 85 parts by weight of a ketone resin, from 0 to 80 parts by weight of a polyamide resin made by condensation of fatty acid dimers and/or trimers with diamine and/or triamine, and from 0 to 30 parts by weight of a ketone resin modified by reaction with alkylisocyanates having from 14 to 22 carbon atoms, and a mixture of organic solvents for the polymeric component.

With reference to the release-coating composition, the ketone resin is made by the aldol-type self-condensation of aliphatic cyclic ketones or by the condensation of aliphatic cyclic ketones with formaldehyde. The preferred ketone resins result from the aldol condensation of cyclohexanone with formaldehyde.

The ketone resins mentioned above are available commercially. The preferred compound is the Krumbhaar K-1717 resin made by Lawter Chemicals. This resin has a softening point of 98° C., a practically neutral acid number and a hydroxyl number of 268; moreover, it is soluble in ketones, acetates and alcohols.

The modified ketone resin is made by the reaction of a ketone resin of the type mentioned above with alkylisocyanates having from 14 to 22 carbon atoms. Preferably the reaction is carried out with a quantity of alkylisocyanate no greater than the stoichiometric quantity with respect to the total number of hydroxyl groups present in the ketone resin.

With regard to the polyamide resin used in the release-coating composition, it is preferable to use a resin made by condensing dilinoleic acid with diamine and/or triamine. It is also preferable to use polyamide resins having an amine number no greater than 3 mg KOH/g, and an acid number no greater than 4 mg KOH/g and a relatively low molecular weight of between 500 and 5,000. Polyamide resins of the type specified above are available commercially. For example, the resin POLYMID 4584 made by Lawter Chemicals and the polyamide resins U.C. 2931 and U.C. 2209 made by Union Camp. may conveniently be used. Of the resins mentioned above, the resin POLYMID 4584 is preferred. It has a softening point of 115° C., an acid number of 3.5 mg KOH/g and an amine number of 2.5 mg KOH/g.

According to the invention, the polymeric component may be constituted either by a binary mixture, comprising the ketone resin and the modified ketone resin or the ketone resin and the polyamide resin, or by a ternary mixture including the three types of resin specified above. The use of binary mixtures is preferable both with regard to the adhesive values which can be achieved on the back of the adhesive tape and the greater simplicity of the measurement of the ingredients. As will also become apparent from the examples which follow, the preferred release-coating composition is a polymeric component constituted by 20 parts by weight of Krumbhaar K-1717 resin and 80 parts by weight of POLYMID 4584 resin.

The preferred solvent for the polymeric component of the release-coating composition according to the invention is a mixture of toluene and isopropanol, preferably in a weight ratio of from 2.5 to 3.

The composition contains about 5 to 20% by weight, preferably 14% by weight, of the polymeric component with reference to the weight of the composition.

The preparation of the release-coating composition does not require special operations and may be carried out without heating, under normal conditions, and without following a particular order of operations.

The release-coating composition which is the subject of the present invention, when applied to the back of an adhesive tape with a polyolefin substrate, has good receptiveness to printing inks of the polyamide-based flexographic type available commercially. It has been found that the receptiveness of to inks and the retention of the property of low adhesiveness by the back after printing are increased by the use of a particular ink.

Thus a second subject of the present invention is a combined system of a release-coating composition and a printing ink for use in the production of a printed adhesive tape, characterised in that it includes the release-coating composition described above and an ink constituted by:

from 25 to 35% by weight, with reference to the weight of the ink, of a polyamide resin which is soluble in alcohols and has an amine number of no more than 3 mg KOH/g and an acid number of no more than 4 mg KOH/g, from 0.3% to 1% by weight of a slip agent constituted by a silicone polymer, and from 7.5% to 30% by weight of a pigment, the remainder of the 100% being constituted by a mixture of solvents.

With reference to the printing ink which is the subject of the combined system of the release-coating composition and the ink for the preparation of a printed adhesive tape, the preferred polyamide resins are Uni-Rez 2209 and Uni-Rez 2931 produced by Union Camp. and the Krumbhaar Resin Polymid 4584. It has been found that the molecular weight of the resin does not influence the adhesive characteristics of the ink substantially.

With regard to the ratio by weight of the resin to the pigment, this is preferably kept as high as possible, within the concentration limits mentioned above, compatible with the hiding power of the colour itself.

The silicone anti-scratch slip agent considerably improves the ink's release characteristics towards the adhesive if introduced within the limits mentioned above of from 0.3% to 1% by weight with respect to the weight of the ink. The preferred slip agent is BYK-301 made by BYK-Mallinkrodt: it has been found that this product makes it possible to prevent the formation of pock marks completely, which phenomenon could give rise to set-off.

It is also possible to use a further additive constituted by a polysiloxane antifoaming agent in quantities of up to 0.5% by weight with respect to the weight of the ink. The preferred antifoaming agent is DB 100 produced by Down Chemicals.

The preferred solvent for the printing ink is a mixture of isopropyl alcohol and VM and P naphtha (Varnish Makers & Painters), preferably 65% isopropyl alcohol and 35% VM & P naphtha.

Table 1 gives the preferred compositions expressed in percentages by weight for red and black printing inks.

TABLE 1

| | red | black |
|---|---|---|
| Polyamide resin (U.C. Uni-Rez 2209) | 33.80 | 34.35 |
| Solvents (65% isopropanol 35% VM & P) | 50.50 | 56.85 |
| Antifoaming silicone (DB - 100) | 0.40 | 0.40 |
| Slip agent (BYK-301) | 0.30 | 0.30 |
| Pigments | 15.00 | 7.50 |

A further subject of the present invention is a pressure-sensitive adhesive tape having a printable release layer obtained by the deposition of the release-coating composition described above.

A further subject of the present invention is an adhesive tape having a release layer made by the deposition of the release-coating composition mentioned above and printing on the release layer effected with the printing ink mentioned above.

The process for preparation of the adhesive tape does not differ from the prior art. The substrate, in the form of a polyolefin film, preferably polypropylene, is subjected to a prior flame or electric discharge treatment in order to modify the surface and adapt it to receive the adhesive and release layers. The release-coating composition is spread on one face of the substrate and the solvent is then evaporated in an oven at a temperature of between 70° and 100° C. until evaporation is complete, the evaporated solvents being recovered at the same time. In order for the release-coating composition to be taken up, it is not necessary for the substrate to have previously been spread with a primer since the release coating will adhere very well directly to the treated polyolefin substrate.

The adhesive layer is deposited on the other face of the substrate possibly after the prior deposition of a primer. The function of the primer which generally consists of a solution or dispersion of elastomers and resins and/or plastomers, is to act as a binder between the film and the adhesive. The solvents used in the solution or dispersion of the primer are removed by hot air, leaving a dry residue of 0.5 to 1.2 g/m² on the support.

The adhesives used for the deposition of the adhesive layer are of conventional type, being constituted by solutions of organic solvents containing mainly elastomers and Tackifier resins of different types, for example aliphatic, terpene, and derivatives of colophony. After the deposition of the solution containing the adhesive, the solvent is eliminated by hot air, a residue of 20 to 25 g/m² being left on the support. Preferably the adhesive layer is applied by the hot melt technique. In this case the adhesive is applied directly to the support without the interposition of the primer, which is no longer necessary. The adhesives used in this technique are block elastomeric copolymers (S.I.S.), Tackifier resins and plasticisers. The release tape provided with the release coating and the adhesive is then wound onto a reel and cut into rolls having the desired dimensions.

The printing operation is then carried out starting with an already-wound tape. The printing is typically carried out by the flexographic system.

EXAMPLE 1

Preparation of the modified ketone resin 0.34 l of xylene and 20 g of powdered ketone resin K-1717 having an hydroxyl number of about 268 are introduced into a 0.5 liter flask having a 3-way connector with an agitator, a thermometer and a reflux condenser supported on a separatory funnel. The temperature of the solution is brought to 100° C. to remove any water present. At the end of this operation the temperature is raised to 110° C. and 26.6 g of stearyl isocyanate are added. The solution is then kept at the temperature of 110° C. under reflux conditions for about 2 hours until the reaction which results in the replacement of the hydroxyl groups by urethane groups is complete. The end of the reaction is determined by IR spectroscopy. The cooled solution is then filtered giving a solution with a 13% dry-weight content. After elimination of the solvents, about 40 g of modified ketone resin are obtained.

EXAMPLE 2

Six release-coating compositions according to the present invention were made with the use of a ketone resin, a polyamide resin and a modified ketone resin obtained by the process described in Example 1. The percentages by weight of the resins constituting the polymeric component are indicated in Table II given below.

TABLE II

| Sample No. | 1 | 2 | 3 | 4 | 5 | 6 |
|---|---|---|---|---|---|---|
| Polyketone (Krumbhaar K-1717) | 20 | 20 | 60 | 30 | 80 | 70 |
| Polyamide (Polymid P 4584) | 80 | — | 40 | 40 | — | — |
| Polyamide (U.C. 2931) | — | 80 | — | — | — | — |
| Modified Polyketone (Example 1) | — | — | — | 30 | 20 | 30 |

The release-coating compositions 1-6 are then applied to the back of a polypropylene film substrate previously flame treated by a conventional method and the substrate is then left in air until the solvent has evaporated, leaving a residue of 1 g/m². To the other face of the treated polypropylene substrate is then applied, by the hot melt technique, a layer of adhesive having the following percentage composition by weight:

| | |
|---|---|
| S.I.S. rubber | 40.5% |
| hydrocarbon resin | 44.5% |
| terpene resin | 4.05% |
| pigments | 6.1% |
| plasticizing oil | 4.05% |
| antioxidants | 0.8% |

The substrate provided with the adhesive layer mentioned above has the following characteristics, measured in accordance with PSTC Standards.

| | |
|---|---|
| adhesiveness on steel | 430 g/cm |
| rolling ball tack | 1 cm |
| holding power on card/steel | >240 h |

For each of the samples prepared, the value of the adhesiveness on the back is measured in accordance with the PSTC Standards before and after ageing at 60° C. for 72 hours, two strips of adhesive tape being superimposed for each sample without weight. Five tests are carried out for each of the samples prepared. The average values obtained for the adhesiveness on the back, before and after ageing, are given in Table III below.

TABLE III

| Sample No. | 1 | 2 | 3 | 4 | 5 | 6 |
|---|---|---|---|---|---|---|
| Adhesiveness on the back (g/cm) | 300 | 340 | 310 | 300 | 300 | 300 |
| Adhesiveness on the back after 72 h at 60° C. (g/cm) | 340 | 430 | 390 | 350 | 400 | 380 |

Each sample of adhesive tape is then printed with the black ink composition given in Table I by means of Mayer B N.O. Table IV gives the results of adhesiveness tests on the back, before and after ageing at 60° C. for 72 hours, together with the qualitative results of a set-off test. The tests are carried out by placing a 25 mm strip of adhesive tape having an adhesiveness on steel of 430 g/cm on the printed part of each sample.

TABLE IV

| Sample No. | 1 | 2 | 3 | 4 | 5 | 6 |
|---|---|---|---|---|---|---|
| Adhesiveness on the back (g/cm) | 320 | 360 | 340 | 330 | 330 | 320 |
| Adhesiveness on the back after 72 h at 60° C. (g/cm) | 370 | 450 | 420 | 380 | 430 | 400 |
| Set-off | none | none | slight | slight | none | none |

The results obtained both with regard to the adhesiveness on the back before and after ageing and the set-off test are entirely satisfactory and no poorer than those which can be obtained with release-coating compositions described by the prior art. In particular, it will be noted that the use of the release-coating composition of the composition 1 of Table II gives adhesiveness values on the back which have not yet been achieved by prior-art compositions.

What is claimed is:

1. A pressure-sensitive adhesive tape consisting of:
   a substrate consisting of a polyolefin film;
   a layer of pressure-sensitive adhesive on one face of said substrate; and
   a release layer on the other face of said substrate, the release layer consisting of a two-component polymeric composition consisting essentially of:
   from 20 to 60% by weight of a ketone resin which is the aldol condensation product of cyclohexanone and formaldehyde, the ketone resin having a softening point of about 98° C., an acid number of substantially zero, and an hydroxyl number of 268, and
   from 20 to 40% by weight of a polyamide resin made by the condensation of at least one fatty acid selected from fatty acid dimers and trimers with at least one amine selected from diamine and triamine, the polyamine resin having an amine number of no more than 3 mg KOH/g, an acid number of no more than 4 mg KOH/g, and a molecular weight of from 500 to 5,000.

2. An adhesive tape as claimed in claim 1, wherein said tape further includes added printing on said release layer made by means of a printing ink comprising, with reference to the weight of said ink:
   from 25% to 35% by weight of a polyamide resin which is soluble in alcohols and has an amine number of no more than 3 mg KOH/g and an acid number of no more than 4 mg KOH/g,
   from 0.3% to 1% by weight of a slip agent constituted by a silicone polymer, and from 7.5% to 30% by weight of pigment, the remainder of the 100% being constituted by a mixture of organic solvents.

3. An adhesive tape as claimed in claim 2, wherein said ink further includes up to 0.5% by weight of a polysiloxane anti-foaming agent.

4. A pressure-sensitive adhesive tape consisting of:
a substrate consisting of a polyolefin film;
a layer of pressure-sensitive adhesive on one face of said substrate; and
a release layer on the other face of said substrate, the release layer consisting of a two-component polymeric composition consisting essentially of:

about 20 parts by weight of a ketone resin which is the aldol condensation product of cyclohexanone and formaldehyde, the ketone resin having a softening point of about 98° C., an acid number of substantially zero, and an hydroxyl number of 268, and about 80 parts by weight of a polyamide resin made by the condensation of at least one fatty acid selected from fatty acid dimers and trimers with at least one amine selected from diamine and triamine, the polyamine resin having an amine number of no more than 3 mg KOH/g, an acid number of no more than 4 mg KOH/g, and a molecular weight of from 500 to 5,000.

* * * * *

UNITED STATES PATENT AND TRADEMARK OFFICE
CERTIFICATE OF CORRECTION

PATENT NO. : 4,587,167
DATED : May 6, 1986
INVENTOR(S) : MAIETTI et al

It is certified that error appears in the above-identified patent and that said Letters Patent is hereby corrected as shown below:

In the claims,

Claim 1, line 14, change "20" to --80--.

Signed and Sealed this

Ninth Day of February, 1988

*Attest:*

DONALD J. QUIGG

*Attesting Officer*  *Commissioner of Patents and Trademarks*